(12) United States Patent
Silverness

(10) Patent No.: US 6,874,835 B1
(45) Date of Patent: Apr. 5, 2005

(54) COLLAPSIBLE RACK FOR STORING LADDERS AND THE LIKE ON A LAND VEHICLE

(76) Inventor: Lee A. Silverness, 10953 17th St., Princeton, MN (US) 55371

( * ) Notice: Subject to any disclaimer, the term of this patent is extended or adjusted under 35 U.S.C. 154(b) by 0 days.

(21) Appl. No.: 10/729,188

(22) Filed: Dec. 8, 2003

(51) Int. Cl.[7] .................................................. B60P 3/00
(52) U.S. Cl. .......................................... 296/3; 224/310
(58) Field of Search ............................... 296/3; 211/85, 211/195, 201; 224/310, 324, 549, 553; 414/462

(56) References Cited

U.S. PATENT DOCUMENTS

| | | | |
|---|---|---|---|
| 3,460,864 A | 8/1969 | Piercy | |
| 4,138,046 A | 2/1979 | De Freze | |
| 4,751,981 A | 6/1988 | Mitchell et al. | |
| 5,037,152 A | 8/1991 | Hendricks | |
| 5,186,588 A | 2/1993 | Sutton et al. | |
| 5,190,337 A | * 3/1993 | McDaniel | 296/3 |
| 5,662,254 A | 9/1997 | Lemajeur et al. | |
| 6,092,972 A | 7/2000 | Levi | |
| 6,427,889 B1 | 8/2002 | Levi | |
| 6,644,704 B1 | * 11/2003 | Nyberg | 296/3 |
| 6,752,301 B1 | * 6/2004 | Drolet | 224/405 |

* cited by examiner

Primary Examiner—Stephen Gordon
(74) Attorney, Agent, or Firm—Donald R. Schoonover

(57) ABSTRACT

A rack includes a base section that is securely mounted on the top of a land vehicle and an item-engaging section that is movably mounted on the base section. The item-engaging section moves on rollers between a stored position that is basically congruent with the base section and a deployed position that locates ladders or like items being stored on the vehicle adjacent to the side of the land vehicle.

3 Claims, 5 Drawing Sheets

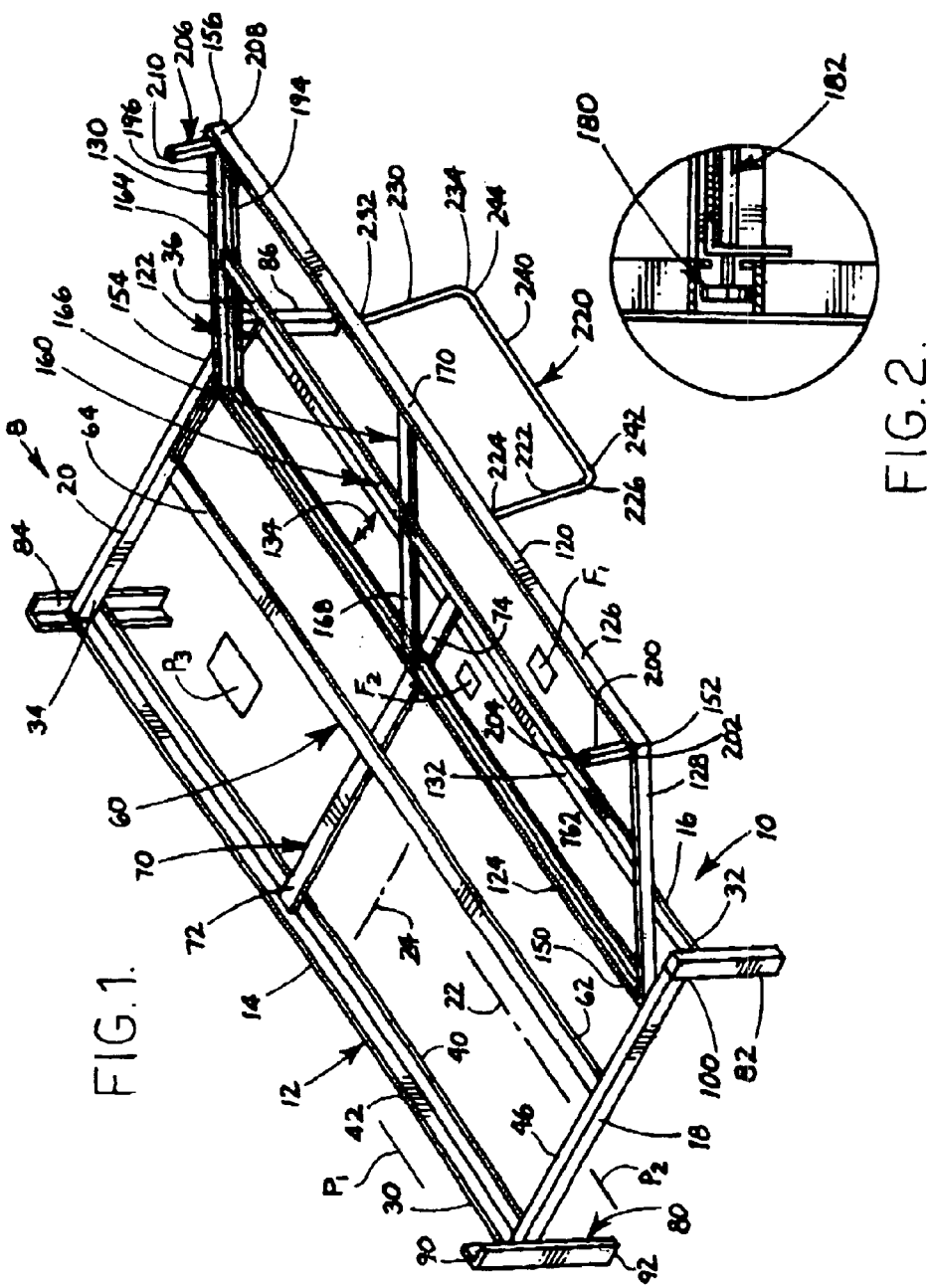

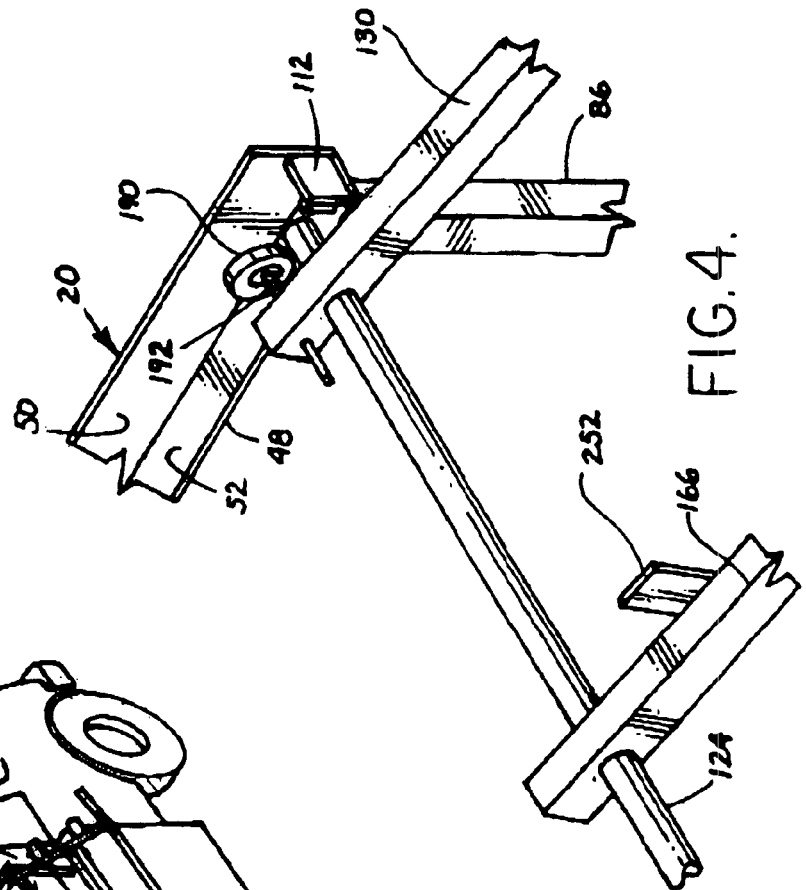
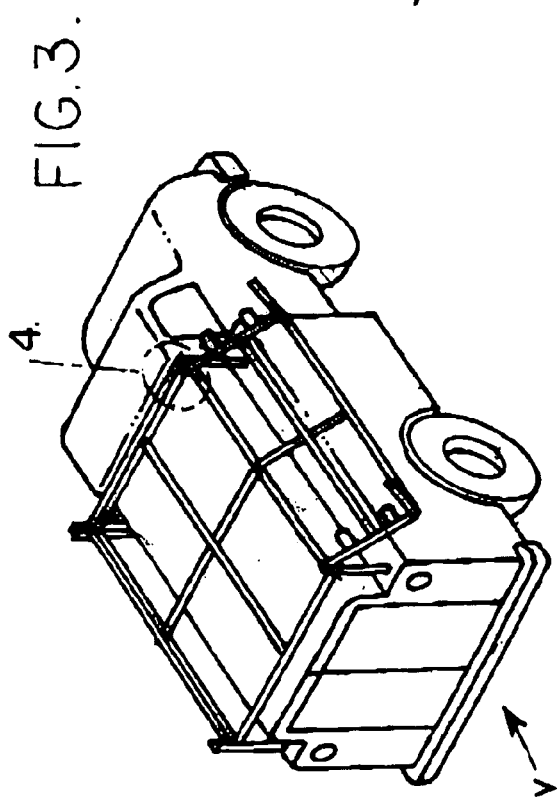

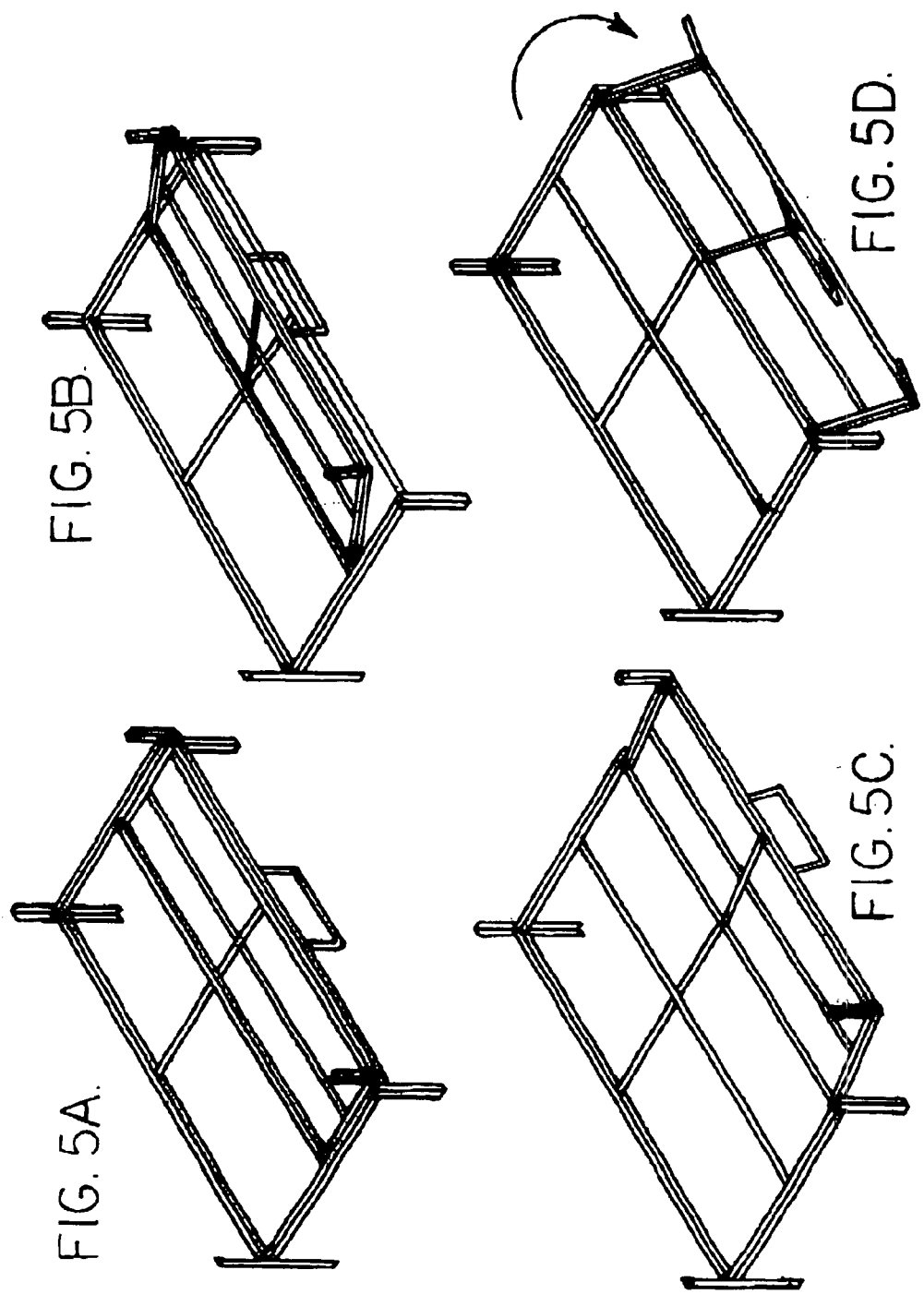

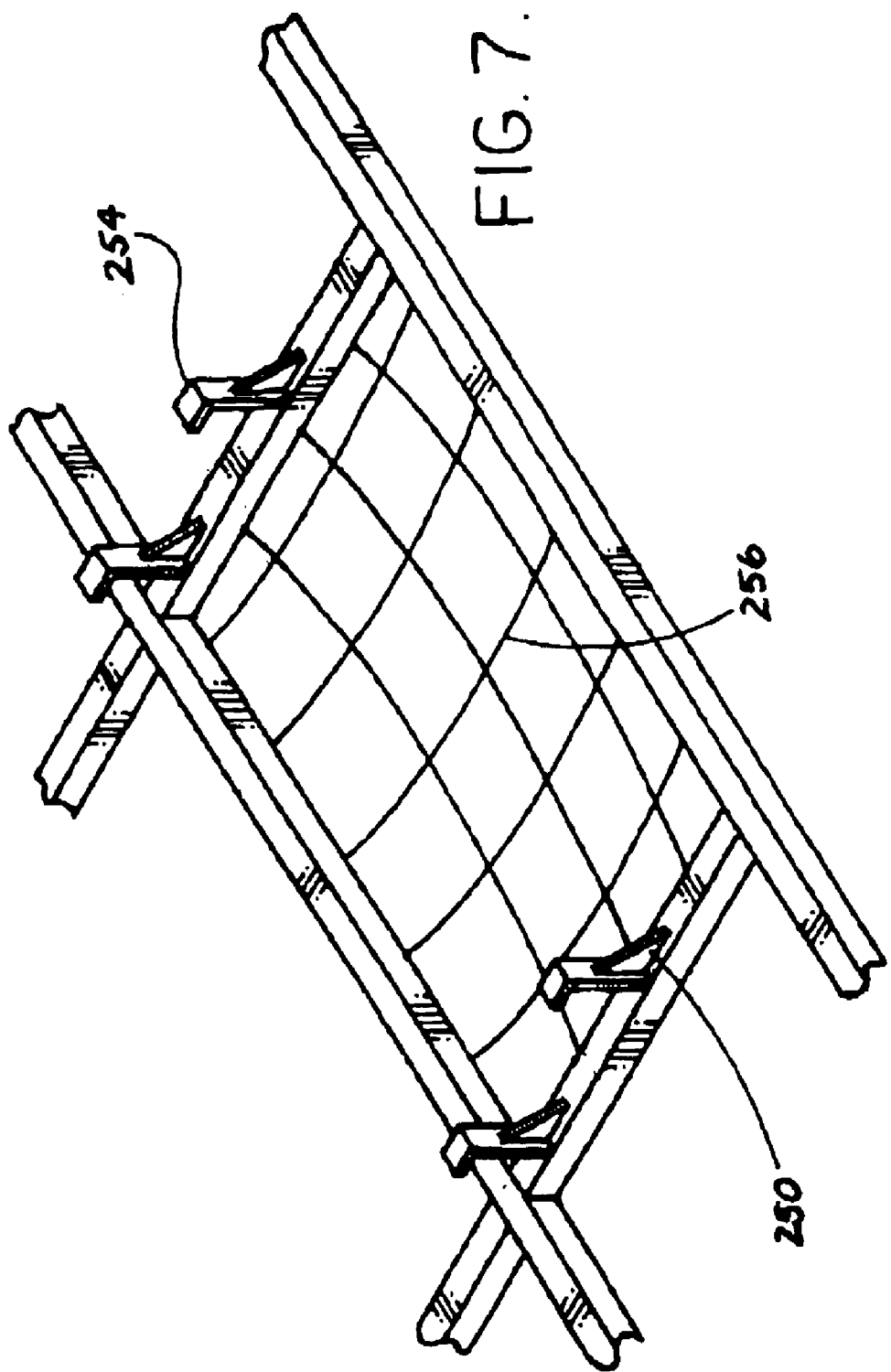

COLLAPSIBLE RACK FOR STORING LADDERS AND THE LIKE ON A LAND VEHICLE

BACKGROUND OF THE INVENTION

1. Field of the Invention

The present invention relates to the general art of racks and carriers, and to the particular field of racks and carriers used on land vehicles.

2. Discussion of the Related Art

Many people carry ladders and/or scaffolding, or the like, on their car or truck. These items are used for various purposes by various workers, such as by painters, carpenters, and the like. Often these items are quite bulky and may be difficult to handle. If the items are stored on top of a truck, it may be difficult to remove the item from the truck.

Therefore, there is a need for a rack that is used on a land vehicle that will hold items in a manner that makes removing the items easy and expeditious.

It may be especially difficult to remove a bulky item from the top of a truck if the person trying to remove the item is short and has to reach up to grasp the item.

Therefore, there is a need for a rack that is used on a land vehicle that will hold items in a manner that makes removing the items easy and expeditious even if the person removing the item is shorter than the truck.

Those using ladders and the like are used to storing the items on top of their vehicle. Therefore, to be commercially successful, a rack that is used to store items should store those items in a manner which is familiar to those who will be using the device.

Therefore, there is a need for a rack that is used on a land vehicle that will hold items in a manner that makes removing the items easy and expeditious, yet will effect the storage in a manner that is familiar to those using the rack.

PRINCIPAL OBJECTS OF THE INVENTION

It is a main object of the present invention to provide a rack that is used on a land vehicle that will hold items, such as ladders, or the like, in a manner that makes removing the items easy and expeditious.

It is another object of the present invention to provide a rack that is used on a land vehicle that will hold items in a manner that makes removing the items easy and expeditious even if the person removing the item is shorter than the truck.

It is another object of the present invention to provide a rack that is used on a land vehicle that will hold items in a manner that makes removing the items easy and expeditious, yet will effect the storage in a manner that is familiar to those using the rack.

SUMMARY OF THE INVENTION

These, and other, objects are achieved by an item storage rack that includes a base section that is adapted to be supported on the top of a land vehicle, such as a truck, or the like, and which includes C-shaped frame end elements and legs. The end elements define channels. An item-engaging section has rollers that are accommodated in the channels so the item-engaging section can move between a storage position and a use position. The rollers are attached to the item-engaging section by axles. The item-engaging section is rotatably mounted on the axles and can move between a stored position which is essentially co-planar with the frame and a deployed position that is oriented at a right angle with respect to the frame. A handle is on the item-engaging section and is used to move the item-engaging section between the storage position and the use position and the deployed position.

It is to be understood that while the device embodying the present invention will sometimes be referred to as a ladder rack, the device can support other items, including scaffolds as well, without departing from the scope of the present disclosure. The use of the term "ladder" is for convenience and is not intended to be limiting.

Items stored on the item-engaging section thus are moved from atop the vehicle to a position spaced apart from the top of the vehicle and then can be rotated down on the side of the vehicle for easy access. Item storage follows movements which are reverse to the just-described movements.

Using the rack embodying the present invention will permit a bulky item to be easily and expeditiously removed from a land vehicle, even if the person is shorter than the top of the land vehicle. The rack is easily moved into a position which permits the person to easily grasp the item and remove it from the vehicle. However, the item can still be easily stored on the land vehicle.

BRIEF DESCRIPTION OF THE DRAWING FIGURES

FIG. 1 is a perspective view of a rack embodying the present invention.

FIG. 2 is a detail showing a roller used in the rack of the present invention.

FIG. 3 illustrates the rack embodying the present invention in place on top of a land vehicle.

FIG. 4 is a detail showing a roller used in the rack of the present invention with the rack in the deployed configuration.

FIGS. 5A–5D illustrate operation of the rack embodying the present invention.

FIG. 7 shows an alternative form of the rack of the present invention.

DETAILED DESCRIPTION OF THE PREFERRED EMBODIMENT

Figure 6B:
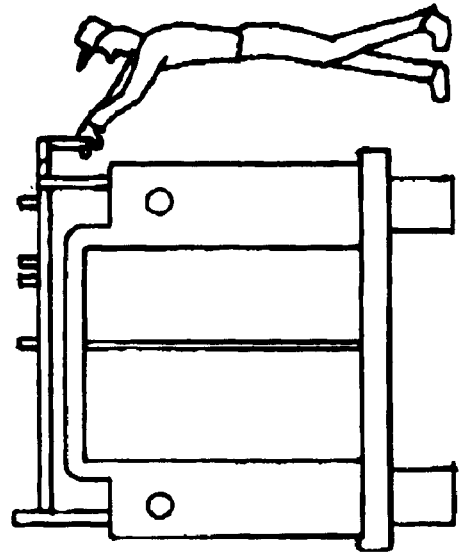
FIGS. 6A–6D illustrate the operation of the rack embodying the present invention in combination with a land vehicle.

Other objects, features and advantages of the invention will become apparent from a consideration of the following detailed description and the accompanying drawings.

Referring to the Figures, it can be understood that the present invention is embodied in an item storage rack 8 that is adapted for use on a land vehicle V such as a truck, or the like, to hold items on the truck in a manner that makes it easy and expeditious for a user to mount and dismount the items on and from the vehicle.

Rack 8 comprises a base section 10 that is adapted to be mounted on top of land vehicle V and which includes a frame 12 which includes a first frame side element 14, a second frame side element 16, a first frame end element 18, a second frame end element 20, a longitudinal axis 22 which extends between the first frame end element 18 and the second frame end element 20, and a transverse axis 24 which extends between the first frame side element 14 and the second frame side element 16. The frame side elements 14, 16 intersect the frame end elements 18, 20 to form a polygon, such as a rectangle. A first corner 30 is formed at an intersection between the first frame end element 18 and the first frame side element 14, a second corner 32 is formed at an intersection between the first frame end element 18 and the second frame side element 16, a third corner 34 is formed at an intersection between the first frame side element 14 and the second frame end element 20, and a fourth corner 36 is formed at an intersection between the second frame end element 20 and the second frame side element 16.

The first frame side element 14 is L-shaped and has a first flange 40 that is a bottom flange when the frame 12 is in a use orientation on the vehicle as shown in FIG. 3 and a second flange 42 that is a side flange when the frame 12 is in the use orientation. The first frame end element 18 and the second frame end element 20 are each C-shaped. Each C-shaped frame end element 18, 20 has a first flange 46 that is a top flange when the frame 12 is in the use orientation, a second flange 48 which is a bottom flange when the frame 12 is in the use orientation and a third flange 50 which is a side flange when the frame 12 is in the use orientation. The flanges 46, 48, 50 of each C-shaped frame end element 18, 20 define a channel, such as channel 52 shown in FIG. 4. A longitudinal support element 60 is connected at a first end 62 thereof to the first frame end element 18 and a second end 64 thereof is connected to the second frame end element 20. A transverse support element 70 has a first end 72 fixed to the first frame side element 14 and a second end 74 fixed to the second frame side element 16. A first leg 80 is fixed to the frame 12 adjacent to the first corner 30, a second leg 82 is fixed to the frame 12 adjacent to the second corner 32, a third leg 84 is fixed to the frame 12 adjacent to the third corner 34 and a fourth leg 86 is fixed to the frame 12 adjacent to the fourth corner 36. Each leg 80, 82, 84, 86 has a first end, such as end 90, that is a top end when the frame 12 is in the use orientation and a second end, such as end 92, that is a bottom end when the frame 12 is in the use orientation.

The first ends 90 of the first and second legs 80, 82 are co-planar with each other in a first plane $P_1$ and the second ends 92 of the legs 80, 82 are co-planar with each other in a second plane $P_2$ that is spaced apart from the first plane $P_1$. The frame side and end elements 14, 16, 18, 20 are co-planar with each other in a third plane $P_3$. The third plane $P_3$ is spaced apart from the first and second planes $P_1$, $P_2$ with the third plane $P_3$ being located between the first and second planes $P_1$, $P_2$.

A first stop element 100 is on the first frame side element 14 of the frame 12 adjacent to the second corner 32 of the frame 12. A second stop element 112 is identical to the first stop element 100 and is located on the second frame side element 16 of the frame 12 adjacent to the fourth corner 36 of the frame 12.

An item-engaging section 120 includes a frame 122 which includes a first frame side element 124, a second frame side element 126, a first frame end element 128, a second frame end element 130, a longitudinal axis 132 which extends between the first frame end element 128 of the item-engaging section 120 and the second frame end element 130 of the item-engaging section 120, and a transverse axis 134 which extends between the first frame side element 124 of the item-engaging section 120 and the second frame side element 126 of the item-engaging section 120. The frame side elements 124, 126 of the item-engaging section 120 and the frame end elements 128, 130 of the item-engaging section 120 are co-planar with each other and are contained in a first plane $P_1$ of the item-engaging section 120. The frame side elements 124, 126 of the item-engaging section 120 intersect the frame end elements 128, 130 of the item-engaging section 120 to form a polygon which is identical in size and shape to the polygon formed by the frame 12.

A first corner 150 is formed at an intersection between the first frame end element 128 of the item-engaging section 120 and the first frame side element 124 of the item-engaging section 120. A second corner 152 is formed at an intersection between the first frame end element 128 of the item-engaging section 120 and the second frame side element 126 of the item-engaging section 120. A third corner 154 is formed at an intersection between the first frame side element 124 of the item-engaging section 120 and the second frame end element 130 of the item-engaging section 120. A fourth corner 156 is formed at an intersection between the second frame end element 130 of the item-engaging section 120 and the second frame side element 126 of the item-engaging section 120. A longitudinal support element 160 has a first end 162 fixed to the first frame end element 128 of the item-engaging section and a second end 164 fixed to the second frame end element 130 of the item-engaging section 120. A transverse support element 166 has a first end 168 fixed to the first frame side element 124 of the item-engaging section 120 and a second end 170 fixed to the second frame side element 126 of the item-engaging section 120.

A first roller element 180 is mounted on the item-engaging section 120 adjacent to the first corner 150-engaging of the item-engaging section 120 and a first axle 182 rollably mounts the first roller element 180 to the item-engaging section 120. A second roller element 190 is mounted on the item-engaging section 120 adjacent to the third corner 154 of the item-engaging section 120, a second axle 192 rollably mounts the second roller element 190 to the item-engaging section 120. The first roller element 180 is rollably accommodated in the C-shaped first end element 18 of the frame 12 and moves between a storage position shown in FIG. 5A adjacent to the first corner 30 of the frame 12 and a use position shown in FIG. 5C adjacent to the second corner 32. The second roller element 190 is rollably accommodated in the C-shaped second frame end element 20 of the frame 12 and moves between a storage position adjacent to the third corner 34 of the frame 12 and a use position adjacent to the fourth corner 36 of frame 12.

The frame elements 124, 126, 128, 130 of the item-engaging section 120 are L-shaped and each has a first flange 194 that is a top flange when the frame 122 of the item-engaging section 120 is in the storage position and a second flange 196 that is a side flange when the item-engaging section 120 is in the storage position.

A first corner support element 200 has a first end 202 that is fixed to the second corner 152 of the item-engaging section 120 and a second end 204 that is spaced apart from the first end 202 of the first corner support element 200. A second corner support element 206 has a first end 208 that is fixed to the fourth corner 156 of the item-engaging section 120 and a second end 210 that is spaced apart from the first end 208 of the second corner support element 206. The second ends 204, 210 of the corner support elements 200, 206 are co-planar with each other and are contained in a second plane $F_2$ of the item-engaging section 120. The second plane of the item-engaging section 120 is spaced apart from the first plane of the item-engaging section 120.

The item-engaging section 120 is rotatable about the first and second axles 182, 192 between a storage position shown in FIG. 5A that has the first plane of the item-engaging section 120 essentially co-planar with the third plane of the frame 12 and a deployed position shown in FIG. 5D that has the first plane of the item-engaging section 120 oriented at a right angle with respect to the third plane of the frame 12.

A handle 220 is U-shaped and has a first leg 222 which has a first end 224 fixed to the second frame side element 126 of the item-engaging section 120, a second end 226 spaced apart from the second frame side element 126 of the item-engaging section 120, a second leg 230 which has a first end 232 which is fixed to the second frame side element 126 of the item-engaging section 120, a second end 234 which is spaced apart from the second frame side element 126 of the item-engaging section 120, and a bight section 240 which has has a first end 242 which is connected to the second end 92 of the first leg 80 and a second end 244 which is connected to the second end 92 of the second leg 82.

Figure 6D:
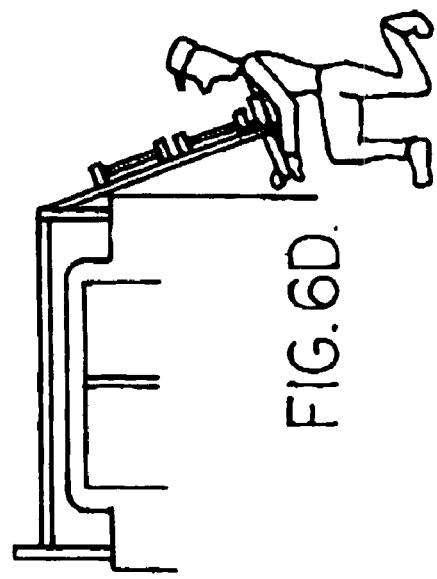
Figure 6A:
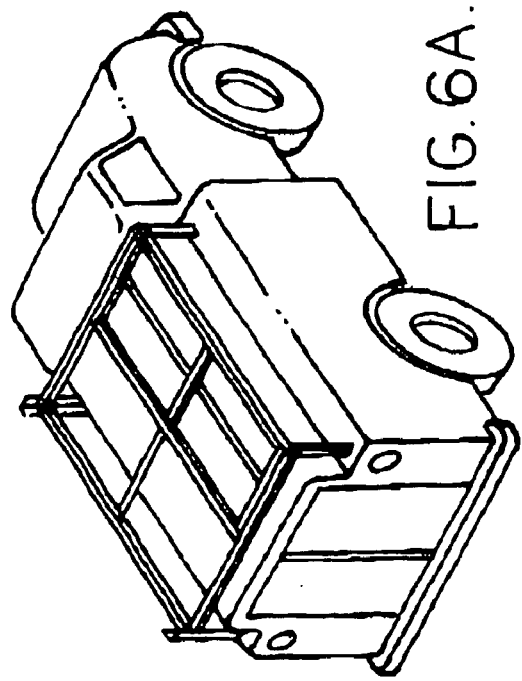
Figure 6C:
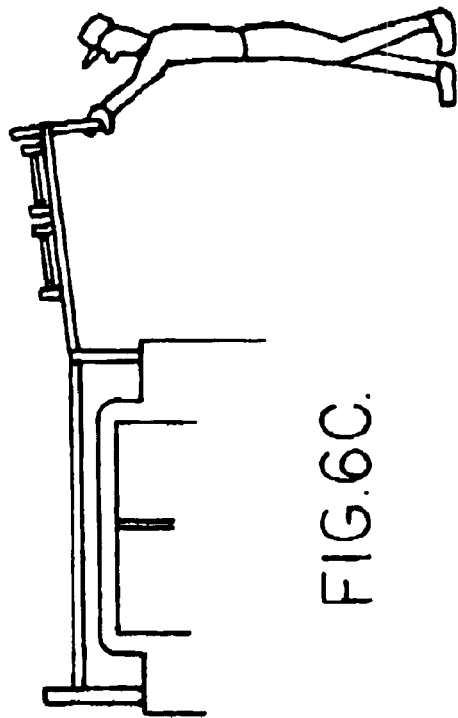

As can be understood from FIGS. 6A–6D and from FIGS. 5A–5D, use of rack 10 includes grasping the handle 220 on the item-engaging section 120 and pulling that section 120 toward the side of the vehicle as indicated in FIG. 6B. Any items on the rack will be moved toward the side of the vehicle. The item-engaging section 120 will ride on the roller elements 180, 190 in the manner of a drawer. Once the item-engaging section 120 reaches the end of its travel, the rollers 180, 190 engage the stops 100, 112 and the item-engaging section 120 is rotated as shown in FIGS. 6C and 6D to place the item-engaging section 120 adjacent to the side of the vehicle. The items can be removed and used as required. Loading items back on the vehicle will involve the reverse process.

Stops, such as stops 250, 252 and 254, can be included to ensure stability of the supported items, and a net, such as net 256, can also be included if desired.

The size of the item-engaging section 120 can be identical to the size of the frame 12, or the width dimension of the item-engaging section 120 as measured in the direction of the transverse axis 134 of the item-engaging section 120 can be one-half the width dimension of the frame 12 as measured in the direction of the transverse axis 24 of the frame 12.

It is understood that while certain forms of the present invention have been illustrated and described herein, it is not to be limited to the specific forms or arrangements of parts described and shown.

What is desired to be covered by Letters Patent is as follows:

1. A storage rack comprising:
a) a base section that is adapted to be mounted on top of a land vehicle and which includes a frame which includes a first frame side element, a second frame side element, a first frame end element, a second frame end element, a longitudinal axis which extends between the first frame end element and the second frame end element, a transverse axis which extends between the first frame side element and the second frame side element, the frame side elements intersecting the frame end elements to form a polygon, a first corner formed at an intersection between the first frame end element and the first frame side element, a second corner formed at an intersection between the first frame end element and the second frame side element, a third corner formed at an intersection between the first frame side element and the second frame end element, a fourth corner formed at an intersection between the second frame end element and the second frame side element, the first frame side element being L-shaped and having a first flange that is a bottom flange when the frame is in a use orientation and a second flange that is a side flange when the frame is in the use orientation, the first frame end element and the second frame end element being C-shaped, each C-shaped frame end element having a first flange that is a top flange when the frame is in the use orientation, a second flange which is a bottom flange when the frame is in the use orientation and a third flange which is a side flange when the frame is in the use orientation, the flanges of each C-shaped frame end element defining a channel, a longitudinal support element which is connected at a first end thereof to the first frame end element and at a second end thereof to the second frame end element, a transverse support element having a first end fixed to the first frame side element and a second end fixed to the second frame side element, a first leg fixed to the frame adjacent to the first corner, a second leg fixed to the frame adjacent to the second corner, a third leg fixed to the frame adjacent to the third corner, and a fourth leg fixed to the frame adjacent to the fourth corner, each leg having a first end that is a top end when the frame is in the use orientation and a second end that is a bottom end when the frame is in the use orientation, the first ends of the first and second legs being co-planar with each other in a first plane and the second ends of at least the first and second legs being co-planar with each other in a second plane that is spaced apart from the first plane, the frame side and end elements being co-planar with each other in a third plane, the third plane being spaced apart from the first and second planes with the third plane being located between the first and second planes;
b) a first stop element on the second frame side element of the frame adjacent to the second corner of the frame;
c) a second stop element on the second frame side element of the frame adjacent to the fourth corner of the frame;
d) an item-engaging section which includes a frame which includes a first frame side element, a second frame side element, a first frame end element, a second frame end element, a longitudinal axis which extends between the first frame end element of the item-engaging section and the second frame end element of the item-engaging section, a transverse axis which extends between the first frame side element of the item-engaging section and the second frame side element of the item-engaging section, the frame side elements of the item-engaging section and the frame end elements of the item-engaging section being co-planar with each other and contained in a first plane of the item-engaging section, the frame side elements of the item-engaging section intersecting the frame end elements of the item-engaging section to form a polygon, a first corner formed at an intersection between the first frame end element of the item-engaging section and the first frame side element of the item-engaging section, a second corner formed at an intersection between the first frame end element of the item-engaging section and the second frame side element of the item-engaging section, a third corner formed at an intersection between the first frame side element of the item-engaging section and the second frame end element of the item-engaging section, a fourth corner formed at an intersection between the second frame end element of the item-engaging section and the second frame side element of the item-engaging section, a longitudinal support element having a first end fixed to the first frame end element of the item-engaging section and a second end fixed to the second frame end element of the item-engaging section, a transverse support element having a first end fixed to the first frame side element of the item-engaging section and a second end fixed to the second frame side element of the item-engaging section, a first roller element mounted on the item-engaging section adjacent to the first corner of the item-engaging section, a first axle rollably mounting the first roller to the item-engaging section, a second roller element mounted on the item-engaging section adjacent to the third corner of the item-engaging section, a second axle rollably mounting the second roller to the item-engaging section, the first roller element being rollably accommodated in the C-shaped first end element of the base section frame and moving between a storage position adjacent to the first corner of the base section frame and a use position adjacent to the second corner of the base section frame, the second roller element being rollably accommodated in the C-shaped second frame end element of the base section frame and moving between a storage position adjacent to the third corner of the base section frame and a use position adjacent to the fourth corner of the base section frame, the frame elements of the item-engaging section being L-shaped and each having a first flange that is a top flange when the frame of the item-engaging section is in a storage position and a second flange that is a side flange when the item-engaging section is in the storage position, a first corner support element having a first end fixed to the second corner of the item-engaging section and a second end spaced apart from the first end of the first corner support element, a second corner support element having a first end fixed to the fourth corner of the item-engaging section and a second end spaced apart from the first end of the second corner support element, the second ends of the corner support elements being co-planar with each other and being contained in a second plane of the item-engaging section, the second plane of the item-engaging section being spaced apart from the first plane of the item-engaging section;

e) the item-engaging section being rotatable about the first and second axles between a storage position that has the first plane of the item-engaging section essentially co-planar with the third plane of the base section frame and a deployed position that has the first plane of the item-engaging section oriented at a right angle with respect to the third plane of the base section frame; and f) a handle which is U-shaped and has a first leg having a first end fixed to the second frame side element of the item-engaging section, a second end spaced apart from the second frame side element of the item-engaging section, a second leg having a first end fixed to the second frame side element of the item-engaging section, a second end which is spaced apart from the second frame side element of the item-engaging section, a bight section having a first end connected to the second end of the first leg and a second end connected to the second end of the second leg.

2. The storage rack as described in claim 1 further including a first item support element on the first frame end element of the item-engaging section and a second item support element on the second frame end element of the item-engaging section.

3. The storage rack as described in claim 1 further including a net on the item-engaging section.

* * * * *